US010009101B2

(12) United States Patent
Everett et al.

(10) Patent No.: US 10,009,101 B2
(45) Date of Patent: *Jun. 26, 2018

(54) LASER COMMUNICATIONS FOLLOWING AN ATMOSPHERIC EVENT

(71) Applicant: THE BOEING COMPANY, Chicago, IL (US)

(72) Inventors: Matthew M. Everett, Chicago, IL (US); John P. Leuer, Chicago, IL (US); David A. Whelan, Chicago, IL (US); Stephen G. Lambert, Chicago, IL (US)

(73) Assignee: The Boeing Company, Chicago, IL (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/660,781

(22) Filed: Mar. 17, 2015

(65) Prior Publication Data

US 2017/0026122 A1 Jan. 26, 2017

(51) Int. Cl.
| | |
|---|---|
| *H04B 10/00* | (2013.01) |
| *H04B 17/00* | (2015.01) |
| *H04B 3/00* | (2006.01) |
| *H04B 10/118* | (2013.01) |
| *H04B 10/50* | (2013.01) |
| *H04B 7/19* | (2006.01) |
| *H01Q 3/40* | (2006.01) |
| *H01Q 21/06* | (2006.01) |
| *H01Q 25/00* | (2006.01) |

(Continued)

(52) U.S. Cl.
CPC ............ *H04B 10/118* (2013.01); *H04B 7/19* (2013.01); *H04B 10/00* (2013.01); *H04B 10/503* (2013.01); *G02F 1/00* (2013.01); *H01Q 3/40* (2013.01); *H01Q 21/061* (2013.01); *H01Q 25/00* (2013.01); *H04B 10/112* (2013.01)

(58) Field of Classification Search
CPC ...... H04B 10/118; H04B 7/19; H04B 10/503; H04B 7/195; H04B 7/185; H04B 7/18513; H04B 7/18515; H04B 10/00; B64G 1/10; B64G 1/1078; B64G 1/1021; G02F 1/00
USPC .................. 398/124, 121, 125, 128, 130, 12
See application file for complete search history.

(56) References Cited

U.S. PATENT DOCUMENTS

| | | | | |
|---|---|---|---|---|
| 3,530,009 | A * | 9/1970 | Dick ...................... | B64G 1/222 136/202 |
| 3,755,816 | A * | 8/1973 | Kratzer .................. | G01S 11/08 342/458 |

(Continued)

*Primary Examiner* — Ken N Vanderpuye
*Assistant Examiner* — Abbas H Alagheband
(74) *Attorney, Agent, or Firm* — Haynes and Boone, LLP

(57) ABSTRACT

Systems, methods, and apparatus for laser communications following an atmospheric event. In one or more embodiments, the disclosed method involves transmitting, by at least one laser on at least one first satellite, at least one first transmit signal. The method further involves receiving, by at least one detector on at least one first satellite, at least one first receive signal. In one or more embodiments, at least one first satellite is in super-geosynchronous earth orbit (S-GEO). In at least one embodiment, at least one first transmit signal and at least one first receive signal are laser signals. Further, the method involves adapting, by at least one first processor on at least one first satellite, at least one first transmit signal according to at least one atmospheric event.

21 Claims, 6 Drawing Sheets

(51) Int. Cl.
*H04B 10/112* (2013.01)
*G02F 1/00* (2006.01)

(56) References Cited

U.S. PATENT DOCUMENTS

| | | | | |
|---|---|---|---|---|
| 5,005,040 A * | 4/1991 | Norita | G02B 7/346 |
| | | | 250/201.2 |
| 5,020,411 A * | 6/1991 | Rowan | F02G 1/043 |
| | | | 376/319 |
| 5,337,241 A | 8/1994 | Takahashi | |
| 5,528,502 A | 6/1996 | Wertz | |
| 5,652,750 A * | 7/1997 | Dent | H04B 7/18532 |
| | | | 342/352 |
| 5,717,510 A * | 2/1998 | Ishikawa | H04L 7/0037 |
| | | | 398/147 |
| 5,896,217 A * | 4/1999 | Ishikawa | H04B 10/0795 |
| | | | 398/1 |
| 5,961,077 A | 10/1999 | Koppel et al. | |
| 6,059,233 A | 5/2000 | Koppel et al. | |
| 6,078,567 A | 6/2000 | Traill et al. | |
| 6,181,450 B1 * | 1/2001 | Dishman | H04B 7/18521 |
| | | | 370/281 |
| 6,222,658 B1 * | 4/2001 | Dishman | H04B 10/118 |
| | | | 370/281 |
| 6,229,631 B1 * | 5/2001 | Sato | H04B 10/0775 |
| | | | 398/147 |
| 6,297,897 B1 | 10/2001 | Czichy et al. | |
| 7,130,505 B2 * | 10/2006 | Shen | G02B 6/12019 |
| | | | 385/24 |
| 7,277,641 B1 | 10/2007 | Gleckman | |
| 7,343,099 B2 * | 3/2008 | Wirth | G02B 26/06 |
| | | | 398/123 |
| 7,379,673 B2 * | 5/2008 | Krill | H04B 10/118 |
| | | | 398/118 |
| 7,382,535 B2 | 6/2008 | Hulsey | |
| 7,415,230 B2 * | 8/2008 | Kawamura | G03G 15/0813 |
| | | | 399/265 |
| 7,437,077 B2 * | 10/2008 | Wirth | G02B 26/06 |
| | | | 250/201.9 |
| 7,450,857 B2 * | 11/2008 | Dress | G06E 3/006 |
| | | | 398/164 |
| 7,532,819 B1 * | 5/2009 | Triebes | H04B 10/118 |
| | | | 398/121 |
| 7,561,802 B2 * | 7/2009 | Krill | H04B 10/118 |
| | | | 398/121 |
| 7,627,251 B2 | 12/2009 | Walther et al. | |
| 7,630,648 B2 * | 12/2009 | Dress | G06E 3/006 |
| | | | 398/164 |
| 7,970,279 B2 * | 6/2011 | Dress | G06E 3/006 |
| | | | 398/168 |
| 8,081,876 B2 * | 12/2011 | Dress | G06E 3/006 |
| | | | 398/164 |
| 8,205,838 B2 | 6/2012 | Moorer et al. | |
| 8,210,480 B2 * | 7/2012 | Moorer | B64G 1/1078 |
| | | | 244/158.4 |
| 8,229,304 B1 * | 7/2012 | Pepper | H04B 10/61 |
| | | | 398/162 |
| 8,240,611 B2 | 8/2012 | Vance | |
| 8,457,810 B1 | 6/2013 | Batla et al. | |
| 8,767,210 B1 * | 7/2014 | Lukashin | G01J 1/10 |
| | | | 356/369 |
| 8,930,048 B1 | 1/2015 | Batla et al. | |
| 9,231,698 B2 * | 1/2016 | Erkmen | H04B 10/1129 |
| 2002/0046763 A1 * | 4/2002 | Berrios | H02J 7/35 |
| | | | 136/244 |
| 2002/0063917 A1 * | 5/2002 | Mizushima | H04B 10/1141 |
| | | | 398/43 |
| 2002/0137457 A1 * | 9/2002 | Nivens | H04B 7/18513 |
| | | | 455/13.4 |
| 2002/0160710 A1 | 10/2002 | Castiel et al. | |
| 2002/0167708 A1 * | 11/2002 | Tsao | H04B 10/118 |
| | | | 398/204 |
| 2002/0198632 A1 * | 12/2002 | Breed | B60N 2/2863 |
| | | | 701/1 |
| 2003/0220740 A1 * | 11/2003 | Intriligator | G01W 1/10 |
| | | | 702/3 |
| 2004/0110467 A1 * | 6/2004 | Wang | H04B 7/18513 |
| | | | 455/12.1 |
| 2004/0130702 A1 * | 7/2004 | Jupp | G01S 7/497 |
| | | | 356/5.01 |
| 2004/0156640 A1 * | 8/2004 | Dress | G06E 3/006 |
| | | | 398/140 |
| 2004/0264970 A1 * | 12/2004 | Valley | H04B 10/118 |
| | | | 398/121 |
| 2005/0100339 A1 * | 5/2005 | Tegge, Jr. | H04B 10/118 |
| | | | 398/125 |
| 2005/0180753 A1 * | 8/2005 | Wirth | G02B 26/06 |
| | | | 398/118 |
| 2005/0196166 A1 * | 9/2005 | Wirth | G02B 26/06 |
| | | | 398/33 |
| 2006/0040612 A1 | 2/2006 | Min | |
| 2006/0153498 A1 * | 7/2006 | Shen | G02B 6/12019 |
| | | | 385/24 |
| 2006/0167784 A1 * | 7/2006 | Hoffberg | G06Q 20/401 |
| | | | 705/37 |
| 2006/0276128 A1 | 12/2006 | Castiel et al. | |
| 2007/0031150 A1 * | 2/2007 | Fisher | H04B 10/1125 |
| | | | 398/128 |
| 2007/0046945 A1 * | 3/2007 | Schwiesow | G01P 5/26 |
| | | | 356/451 |
| 2007/0135051 A1 * | 6/2007 | Zheng | H04B 7/18563 |
| | | | 455/63.1 |
| 2008/0008471 A1 * | 1/2008 | Dress | G06E 3/006 |
| | | | 398/66 |
| 2008/0181108 A1 * | 7/2008 | Hashmi | H04B 7/18513 |
| | | | 370/231 |
| 2009/0028573 A1 * | 1/2009 | Krill | H04B 10/118 |
| | | | 398/125 |
| 2009/0041459 A1 * | 2/2009 | Dress | G06E 3/006 |
| | | | 398/66 |
| 2009/0177760 A1 * | 7/2009 | Gonzalez | H04N 21/262 |
| | | | 709/219 |
| 2009/0202254 A1 * | 8/2009 | Majumdar | H04B 10/1123 |
| | | | 398/140 |
| 2010/0003029 A1 * | 1/2010 | Dress | G06E 3/006 |
| | | | 398/66 |
| 2010/0269143 A1 * | 10/2010 | Rabowsky | H04B 7/18591 |
| | | | 725/63 |
| 2011/0036951 A1 | 2/2011 | Moorer et al. | |
| 2011/0036952 A1 | 2/2011 | Moorer et al. | |
| 2011/0049302 A1 * | 3/2011 | Vance | B64G 1/1021 |
| | | | 244/158.4 |
| 2012/0229914 A1 * | 9/2012 | Cook | G02B 15/17 |
| | | | 359/689 |
| 2013/0126713 A1 * | 5/2013 | Haas | H04B 10/116 |
| | | | 250/208.2 |
| 2014/0340487 A1 * | 11/2014 | Gilliland | G01S 7/4863 |
| | | | 348/48 |
| 2015/0012249 A1 * | 1/2015 | Li | G01R 29/26 |
| | | | 702/191 |
| 2015/0106047 A1 * | 4/2015 | Lukashin | G01J 1/10 |
| | | | 702/104 |
| 2015/0192696 A1 * | 7/2015 | Platzer | G01W 1/10 |
| | | | 342/26 A |
| 2015/0197248 A1 * | 7/2015 | Breed | G08G 1/09626 |
| | | | 701/93 |
| 2015/0244458 A1 * | 8/2015 | Erkmen | H04B 10/1129 |
| | | | 398/122 |
| 2015/0349881 A1 * | 12/2015 | Byers | H04B 10/11 |
| | | | 398/38 |
| 2016/0087676 A1 * | 3/2016 | Tanaka | H04B 3/32 |
| | | | 398/193 |
| 2017/0026121 A1 | 1/2017 | Everett et al. | |
| 2017/0090047 A1 * | 3/2017 | Shahar | G01T 1/247 |

* cited by examiner

LASER COMMUNICATIONS FOLLOWING AN ATMOSPHERIC EVENT

FIELD

The present disclosure relates to laser communications. In particular, it relates to laser communications following an atmospheric event.

BACKGROUND

Strategic nuclear forces have unique communications requirements, which are: (1) global coverage, (2) near 100% availability, (3) long lifetime, (4) low probability of detection/interception (LPI/LPD), (5) able to operate without ground intervention, (6) capable of working through challenging atmospheric environments, (7) capable of working through post-nuclear atmospheric effects, (8) resilient to manmade and natural threats, and (9) providing against natural threats, such as Van Allen radiation belts, solar storms, and geomagnetic storms.

Currently, there are a number of communications systems employed and being developed. However, these systems do not meet all of the requirements. These systems include, but are not limited to, the Military Strategic and Tactical Relay (Milstar) communications network/Advanced Extremely High Frequency (AEHF) satellite system, the Lunar Laser Communications Demo (LLCD), the Laser Communications Research Demo (LCRD), and the European Data Relay System (EDRS).

Regarding Milstar/AEHF, AEHF satellites are expensive. In addition, since AEHF satellites are in geosynchronous Earth orbit (GEO), they are easy to detect and track.

LLCD demonstrated laser communications between the Earth and the Moon. LLCD's space element was placed into lunar orbit and was designed to relay scientific data from the Moon to the Earth. Although laser communications is inherently LPI/LPD, and the lunar orbit provides some resiliency to threats, LLCD does not provide global coverage, high availability, long lifetime, or the ability to operate without ground intervention.

LCRD is a planned GEO satellite being developed by the National Aeronautics and Space Administration (NASA) as a laser communications technology demonstration. However, LCRD is to be located in and easily detectable GEO and does not provide global coverage, high availability, long lifetime, or the ability to operate without ground intervention.

EDRS is a planned GEO-based satellite system being developed by the European Space Agency (ESA) that utilizes an optical crosslink between two satellites. EDRS does not provide global coverage, high availability, long lifetime, or the ability to operate without ground intervention.

As such, there is a need for an improved communications system that is able to meet all of the strategic nuclear forces requirements.

SUMMARY

The present disclosure relates to a method, system, and apparatus for laser communications following an atmospheric event. In one or more embodiments, a method for communications involves transmitting, by at least one laser on at least one first satellite, at least one first transmit signal. The method further involves receiving, by at least one detector on at least one first satellite, at least one first receive signal. In one or more embodiments, at least one first satellite is in super-geosynchronous earth orbit (S-GEO). In at least one embodiment, at least one first transmit signal and at least one first receive signal are laser signals. Further, the method involves adapting, by at least one first processor on at least one first satellite, at least one first transmit signal according to at least one atmospheric event.

In one or more embodiments, at least one atmospheric event is a natural event or a manmade event. In at least one embodiment, the natural event is a solar flare. In some embodiments, the manmade event is an electromagnetic pulse (EMP).

In at least one embodiment, at least one first transmit signal employs interleavers, and the interleavers are adaptable according to at least one atmospheric event.

In one or more embodiments, at least one first transmit signal employs codecs, and the codecs are adaptable according to at least one atmospheric event.

In at least one embodiment, a data rate of at least one first transmit signal is adaptable according to at least one atmospheric event.

In one or more embodiments, at least one first transmit signal is modulated, and a modulation format of at least one first transmit signal is adaptable according to at least one atmospheric event.

In at least one embodiment, the method further involves monitoring, with at least one first processor on at least one first satellite, link performance (a bit error rate and/or a signal strength) of at least one receive signal and/or radiation data. The method further involves determining, with at least one first processor on at least one first satellite, whether at least one atmospheric event has occurred using the link performance (the bit error rate and/or the signal strength) and/or the radiation data.

In one or more embodiments, the method further involves monitoring, with at least one second processor associated with at least one user, link performance (a bit error rate and/or a signal strength) of at least one transmit signal and/or radiation data. The method further involves determining, with at least one second processor associated with at least one user, whether at least one atmospheric event has occurred using the link performance (the bit error rate and/or the signal strength) and/or the radiation data.

In at least one embodiment, the method further involves receiving, by at least one user, at least one first transmit signal. In some embodiments, more than one user (i.e. two or more users) are separated by spatial separation. In one or more embodiments, more than one user are separated by spectral separation. In at least one embodiment, more than one user are separated by polarization separation. In some embodiments, more than one user are separated by temporal separation. In one or more embodiments, more than one user are separated by code separation.

In one or more embodiments, the method further involves when at least one atmospheric event occurs, storing, by at least one first processor on at least one first satellite, at least one critical mission parameter of the as-is state of at least one first satellite in memory. In some embodiments, the method further involves when at least one atmospheric event ends, uploading, by at least one first processor on at least one first satellite, at least one critical mission parameter from memory; and configuring, by at least one first processor on at least one first satellite, at least one first satellite according to at least one critical mission parameter.

In one or more embodiments, a system for communications involves at least one laser on at least one first satellite to transmit at least one first transmit signal. The system further involves at least one detector on least one first satellite to receive at least one first receive signal. In one or more embodiments, at least one first satellite is in super-geosynchronous earth orbit (S-GEO). In some embodiments, at least one first transmit signal and at least one first receive signal are laser signals. The system further involves at least one first processor, on at least one first satellite, to adapt at least one first transmit signal according to at least one atmospheric event.

In at least one embodiment, the system further involves at least one shielding on at least one first satellite for protection from at least one atmospheric event. In one or more embodiments, the system further involves at least one telemetry and command (T&C) acquisition sensor on at least one first satellite, where at least one T&C acquisition sensor is radiation hardened. In some embodiments, the system further involves adaptive optics associated with at least one user, where at least one user receives at least one first transmit signal.

In one or more embodiments, a method for communications involves transmitting, by at least one laser on at least one first satellite, at least one first transmit signal. The method further involves receiving, by at least one detector on at least one first satellite, at least one first receive signal. In one or more embodiments, at least one first satellite is in super-geosynchronous Earth orbit (S-GEO). In some embodiments, at least one first transmit signal and at least one first receive signal are laser signals and have a field of regard covering one hemisphere of the Earth.

In one or more embodiments, at least one first transmit signal is transmitted towards Earth.

In at least one embodiment, at least one first transmit signal is transmitted towards an airborne vehicle, a terrestrial vehicle, a terrestrial entity, and/or a marine vehicle.

In one or more embodiments, at least one first transmit signal is transmitted towards at least one second satellite. In some embodiments, at least one second satellite is a lower Earth orbiting (LEO) satellite, a medium Earth orbiting (MEO) satellite, a geosynchronous Earth orbiting (GEO) satellite, a highly elliptical Earth orbiting (HEO) satellite, and/or a S-GEO satellite.

In at least one embodiment, at least one first transmit signal and at least one receive signal have a field of view ranging between approximately 3 to 10 kilometers (km).

In one or more embodiments, the S-GEO is an orbit higher than GEO.

In at least one embodiment, the S-GEO orbit is an orbit approximately five times higher than GEO.

In one or more embodiments, the method further involves transmitting, by at least one transmit antenna on at least one first satellite, at least one second transmit signal. The method further involves receiving, by at least one receive antenna on at least one first satellite, at least one second receive signal. In some embodiments, at least one second transmit signal and at least one second receive signal are radio frequency (RF) signals. In at least one embodiment, at least one transmit antenna and at least one receive antenna are the same antenna or different antennas.

In at least one embodiment, at least one first satellite operates autonomously.

In one or more embodiments, the method further involves gimballing, with at least one first gimbal, at least one laser.

In at least one embodiment, the method further involves gimballing, with at least one second gimbal, at least one detector.

In one or more embodiments, at least one first gimbal and at least one second gimbal are the same gimbal or different gimbals.

In at least one embodiment, the method further involves transmitting, by at least one telemetry and command (T&C) laser on at least one first satellite, at least one T&C transmit signal. The method further involves receiving, by at least one T&C detector on at least one first satellite, at least one T&C receive signal.

In one or more embodiments, a system for communications involves at least one laser, on at least one first satellite, to transmit at least one first transmit signal. The system further involves at least one detector, on at least one first satellite, to receive at least one first receive signal. In one or more embodiments, at least one first satellite is in super-geosynchronous Earth orbit (S-GEO). In some embodiments, at least one first transmit signal and at least one first receive signal are laser signals and have a field of regard covering one hemisphere of the Earth.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1:
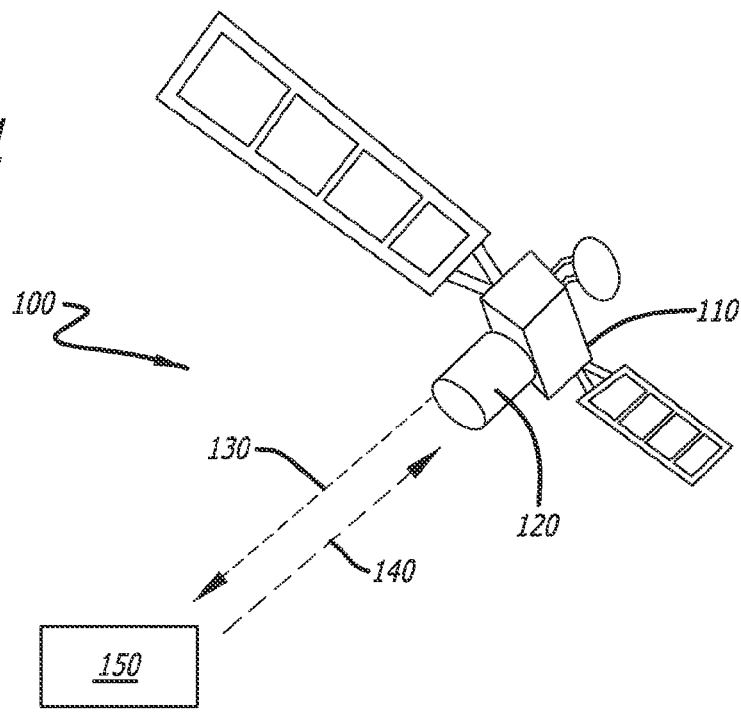
FIG. 1 is a diagram showing an exemplary laser communications satellite, to be employed for the disclosed system for laser communications, including a laser/detector, in accordance with at least one embodiment of the present disclosure.

The methods and apparatus disclosed herein provide an operative system for laser communications in super-geosynchronous Earth orbit (S-GEO). The disclosed system provides an architecture to achieve resiliency against natural (e.g., solar flares) and manmade (e.g., electromagnetic interference (EMI) bursts) threats for a super-geosynchronous (S-GEO) constellation of laser communications satellites by combining a low probability of detection lasercom waveform with an equally low probability of satellite detection S-GEO orbit.

The constellation preferably comprises three or more satellites in an orbit near the equatorial plane. It should be noted that three satellites located in a S-GEO orbit that is five times (5×) geosynchronous Earth orbit (GEO) provide global coverage of the Earth. However, in other embodiments, the satellites in the constellation may orbit in a polar orbit or an inclined orbit. Each satellite provides optical communications service and optical crosslink services to provide uninterrupted service to users. Multiple satellites may be launched per launch vehicle in order to reduce costs. The system optimally includes hybrid radio frequency (RF) services in order to communicate with users blocked by clouds and users without laser communications terminals.

The present disclosure provides a system for communicating optically (via laser(s)) through the atmosphere following an electromagnetic pulse (EMP) by combining a waveform that is resilient to post-EMP atmospheric effects (e.g., an optical frequency waveform) with an approach for detecting an EMP and recovering from the EMP's effects on electronics. The waveform uses an optical wavelength selected to avoid the wavelengths most affected by post-EMP atmospheric effects, a long interleaver to compensate for fades, and an error correcting code for correcting bit errors that occur during fades.

The present disclosure is a combination of employing S-GEO (e.g., five times GEO) for low probability of detection of satellites and resilience against manmade threats plus lasercom links for strategic communications that would avoid probability of detection and interception. In addition, the present disclosure employs laser communications for the purpose of communicating through post-EMP atmospheric effects, which negatively affects RF communications. It should be noted that different wavelengths ($\lambda$) interact differently with these post-EMP effects. As such, the disclosed system takes advantage of these properties by employing laser communications.

As previously mentioned above, strategic nuclear forces have unique communications requirements, which are: (1) global coverage, (2) near 100% availability, (3) long lifetime, (4) low probability of detection/interception (LPI/LPD), (5) able to operate without ground intervention, (6) capable of working through challenging atmospheric environments, (7) capable of working through post-nuclear atmospheric effects, (8) resilient to manmade and natural threats, and (9) providing against natural threats, such as Van Allen radiation belts, solar storms, and geomagnetic storms.

Currently, there are a number of communications systems employed and being developed. However, these systems do not meet all of the requirements. These systems include, but are not limited to, the Military Strategic and Tactical Relay (Milstar) communications network/Advanced Extremely High Frequency (AEHF) satellite system, the Lunar Laser Communications Demo (LLCD), the Laser Communications Research Demo (LCRD), and the European Data Relay System (EDRS). Regarding Milstar/AEHF, AEHF satellites are expensive. In addition, since AEHF satellites are in geosynchronous Earth orbit (GEO), they are easy to detect and track. LLCD demonstrates laser communications between the Earth and the moon. LLCD's space element was placed into lunar orbit and was designed to relay scientific data from the moon to the Earth. Although laser communications is inherently LPI/LPD, and the lunar orbit provides some resiliency to threats, LLCD does not provide global coverage, high availability, long lifetime, or the ability to operate without ground intervention. LCRD is a planned GEO satellite being developed by the National Aeronautics and Space Administration (NASA) as a laser communications technology demonstration. However, LCRD does not provide global coverage, high availability, long lifetime, or the ability to operate without ground intervention. EDRS is a planned GEO-based satellite system being developed by the European Space Agency (ESA) that utilizes an optical crosslink between two satellites. EDRS does not provide global coverage, high availability, long lifetime, or the ability to operate without ground intervention.

The S-GEO lasercom system meets the requirements for strategic nuclear forces with the following improvements over the existing solutions. For a first improvement, compared to Milstar/AEHF, laser communications systems, which are employed by the present disclosure, require less size, weight, and power (SWAP) for a given data rate than a similar radio frequency (RF) communications system. As a result, the strategic lasercom system has lower recurring costs relative to, for example, an AEHF satellite. For a second improvement, compared to Milstar/AEHF, LCRD, LLCD, and EDRS, since laser communication systems provide a reduction in size, optionally more than one satellite in the S-GEO lasercom system may be launched on a single launch vehicle, thereby lowering launch costs. For a third improvement, compared to Milstar/AEHF, LCRD, and EDRS, satellites in the S-GEO lasercom system are in a higher altitude orbit than GEO satellites and are smaller than AEHF satellites. As a result, S-GEO satellites have lower radar and visible cross sections as measured from the Earth, are more difficult to track, and are more difficult to deploy countermeasures against. For a fourth improvement, compared to Milstar/AEHF, LCRD, and EDRS, optionally, satellites in the S-GEO lasercom system may reach their final orbit by being injected into geosynchronous orbit (GEO) or geosynchronous transfer orbit (GT) and then by using, for example, a high specific impulse, low thrust propulsion system they can transfer into the S-GEO orbit. For a fifth improvement, compared to Milstar/AEHF, laser communications systems user narrower wavelengths than RF systems. These narrow wavelengths result in a smaller beam footprint on the Earth—approximately 3 to 10 kilometers (km)—and make the systems inherently difficult to detect and intercept. Using laser communications, which optionally may include laser telemetry and command (T&C), enables the satellites to remain undetected once they have exceeded the maximum range of space surveillance systems.

For a sixth improvement, compared to Milstar/AEHF, LCRD, LLCD, and EDRS, optionally, satellites in the S-GEO lasercom system, as a result of their small size, may be launched as a secondary satellite in tandem with a primary satellite, thereby reducing launch costs and increasing the complexity of tracking their orbits. For a seventh improvement, compared to Milstar/AEHF, LCRD, LLCD, and EDRS, optionally, satellites in the S-GEO lasercom system may include one or more training satellites that would allow operators to train using the system without having to potentially reveal the general location of the operational satellites by pointing at them. For an eighth improvement, compared to LCRD, LLCD, and EDRS, the S-GEO lasercom system has the ability to operate autonomously without ground intervention. For a ninth improvement, compared to Milstar/AEHF, LCRD, LLCD, and EDRS, optionally the S-GEO lasercom system may use wavelengths (e.g., optical wavelengths) that can penetrate the ocean in order to communicate with undersea users.

For a tenth improvement, compared to LCRD, LLCD, and EDRS, optionally, the S-GEO lasercom system may use hybrid LPI/LPD RF communications in order to reach users blocked by clouds (i.e. optical wavelengths have difficulty passing through clouds) and users that do not have laser communications terminals. Although this option will increase the SWAP of the satellites, they will be difficult to detect and track, especially if they refrain from using RF communications until needed. For an eleventh improvement, compared to LCRD and LLCD, optionally, the S-GEO lasercom system may use crosslinks (e.g., optical and/or RF crosslinks) to interconnect the satellites of the constellation. For a twelfth improvement, compared to LCRD and LLCD, optionally, the S-GEO lasercom system may service multiple users per beam by separating user spectrally. For a thirteenth improvement, compared to LCRD and LLCD, optionally, the S-GEO lasercom system may service multiple users per beam by separating users temporally.

For a fourteenth improvement, compared to LLCD and LCRD, the strategic lasercom system uses a wavelength (e.g., a wavelength range) (e.g., an optical wavelength range) selected to avoid the wavelengths (e.g., RF wavelengths) most affected by post-EMP atmospheric effects. For a fifteenth improvement, compared to LLCD and LCRD, optionally, the strategic lasercom system employs additional shielding to protect electronics form the effects of an EMP. For a sixteenth improvement, compared to LLCD and LCRD, optionally, the strategic lasercom system employs radiation hardened telemetry and command (T&C) acquisition sensors to allow them to operate following an EMP. For a seventeenth improvement, compared to LLCD and LRCD, the strategic lasercom system employs adaptive optics (e.g., deformable mirrors) in ground terminals to compensate for post-EMP atmospheric effects. For an eighteenth improvement, compared to LLCD and LCRD, optionally, the strategic lasercom system may use adjustable long interleavers designed to mitigate the effects of long fades caused by post-EMP atmospheric effects.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to laser communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram showing an exemplary laser communications satellite 100, to be employed for the disclosed system for laser communications, including a laser/detector 120, in accordance with at least one embodiment of the present disclosure. In this figure, a satellite 100 is shown having a laser/detector unit 120 mounted onto the bus 110. The laser/detector unit 120 comprises a laser for transmission of optical signals and a detector for reception of optical signals. It should be noted that in other embodiments, the laser and the detector may comprise two separate units rather than one laser/detector unit 120 as is shown in FIG. 1. In one or more embodiments, shielding is employed over at least a portion (e.g., the electronics) of the satellite 100 to shield at least a portion of the satellite 100 from atmospheric events.

During operation of the disclosed system, the satellite 100 orbits the Earth in S-GEO. S-GEO is defined as being an orbit higher than GEO. In one or more embodiments, GEO is a circular orbit of 35,786 kilometers (km) above the Earth's equator and following the direction of the Earth's rotation. However, it should be noted that in other embodiments, GEO may be at an inclined orbit instead of following the Earth's equator. In some embodiments of the present disclosure, S-GEO orbit is approximately five times higher than GEO (e.g., 5*35,786 km=178,930 km). However, it should be noted that S-GEO may be any orbit higher than GEO, such as two times higher than GEO, 2.5 times higher than GEO, three times higher than GEO, four times higher than GEO, etc. Also, during operation of the disclosed system, the laser of the laser/detector 120 of the satellite 100 will transmit at least one transmit signal 130 to a target (e.g., another satellite, a vehicle, entity or Earth) 150, and the detector of the laser/detector 120 will receive at least one receive signal 140 from the target 150. The transmit signal(s) 130 and the receive signal(s) 140 are laser signals (i.e. signals having optical frequencies and wavelengths) and have a field of regard covering one hemisphere of the Earth (refer to FIG. 7).

In some embodiments, during operation of the disclosed system, the laser of the laser/detector 120 transmits at least one transmit signal 130 towards a vehicle and/or entity on Earth, and the detector of the laser/detector 120 receives at least one receive signal 140 back from the vehicle and/or entity on Earth. The vehicle may be an airborne vehicle, a terrestrial vehicle, or a marine vehicle. The airborne vehicle may be, for example, a satellite, a space plane, or an aircraft. The terrestrial vehicle may be, for example, a train, truck, car, or tank. And, the marine vehicle may be, for example, a submarine, a ship, or a boat. The entity may be a terrestrial ground station or a mobile user device.

In at least one embodiment, during operation of the disclosed system, the satellite 100 communicates via a crosslink with another satellite (not shown). For these embodiments, the laser of the laser/detector 120 transmits at least one transmit signal 130 towards the other satellite, and the detector of the laser/detector 120 receives at least one receive signal 140 back from the other satellite. In one or more embodiments, the other satellite is a lower Earth orbit (LEO) satellite, a medium Earth orbit (MEO) satellite, a geosynchronous Earth orbit (GEO) satellite, a highly elliptical Earth orbit (HEO) satellite, or a super-geosynchronous Earth orbit (S-GEO) satellite.

In one or more embodiments, during operation of the disclosed system, at least one processor (not shown) on the satellite 100 monitors the link performance by monitoring the bit error rate (and/or the signal strength) of at least one receive signal 140 received by the detector of the laser/detector 120. It should be noted that in other embodiments, other link attributes other than (or in addition to) the bit error rate and/or the signal strength may be monitored. At least one processor then determines whether at least one atmospheric event has occurred using the bit error rate (and/or the signal strength). For example, if the processor(s) determines that the bit error rate is above a certain predetermined bit error rate threshold (and/or that the signal strength is below a certain predetermined signal strength threshold), then the processor(s) may determine that at least one atmospheric event has occurred. Types of atmospheric events that may be determined to have occurred are manmade events (e.g., EMI, EMP, a nuclear environment) or natural events (e.g., solar flares). After the processor(s) has determined that at least one atmospheric event has occurred, the processor(s) then adapts at least one transmit signal 130 according to the atmospheric event(s). At least one transmit signal 130 may be adapted by adapting the transmit signal's 130 interleavers, codecs, data rate, and/or modulation format.

Regarding interleavers and codecs, in one or more embodiments, at least one transmit signal employs interleavers and/or codecs. Interleavers and codecs are typically used in signals to mitigate optical channel fading caused by atmospheric conditions. A nuclear scintillating environment has the potential to cause additional fading due to the ionizing radiation potentially affecting the atmosphere. In at least one embodiment, during operation of the disclosed system, at least one processor on the satellite 100 adapts at least one transmit signal 130 to contain longer interleavers than the current interleavers (i.e. contain interleavers with longer lengths than the lengths of the current interleavers), for example by increasing the interleaver delay, in order to compensate for the atmospheric event(s). Types of interleavers that may be employed include, but are not limited to, block interleavers and convolutional interleavers. In some embodiments, during operation of the disclosed system, at least one processor on the satellite 100 adapts the transmit signal to contain codecs (e.g., a Turbo Product Code and Low Density Parity Check Code) with an increase in redundancy (i.e. by decreasing the code rate) in order to compensate for the atmospheric event(s). Using interleavers and codecs that are adaptable to the environmental conditions would allow for communications to continue, for example, after a nuclear event.

Regarding the data rate, in at least one embodiment, during operation of the disclosed system, at least one processor on the satellite 100 adapts at least one transmit signal 130 to have a slower data rate in order to compensate for the atmospheric event(s). With regard to the modulation format, in some embodiments, at least one processor on the satellite 100 adapts at least one transmit signal 130 by modifying the modulation format to a more robust waveform (e.g., quadrature phase shift keying (QPSK), binary phase shift keying (BPSK), pulse position modulation (PPM)) in order to compensate for the atmospheric event(s).

After at least one transmit signal 130 is adapted, if the processor(s) determines that the bit error rate is still above the predetermined bit error rate threshold (and/or the signal strength is still below the predetermined signal strength threshold), the processor(s) will further adapt at least one transmit signal 130. The processor(s) will continue to further adapt at least one transmit signal 130 until the processor(s) determines that the bit error rate is no longer above the bit error rate threshold (and/or the signal strength is no longer below the predetermined signal strength threshold).

In some embodiments, during operation of the disclosed system, at least one user processor (not shown) associated with a user (or target 150), associated with a vehicle or an entity, monitors the link performance by monitoring (either continuously or intermittently) the bit error rate (and/or the signal strength) of at least one transmit signal 130 received by the user (or target) 150. At least one user processor then determines whether at least one atmospheric event has occurred using the bit error rate (and/or the signal strength). After the user processor(s) has determined that at least one atmospheric event has occurred, the user processor(s) then sends a message via at least one receive signal 140 to the satellite 100 to adapt at least one transmit signal 130 (e.g., by adapting the transmit signal's 130 interleavers, codecs, data rate, and/or modulation format) according to the atmospheric event(s). Then, after the laser of the laser/detector 120 of the satellite 100 receives the message in at least one receive signal 140, at least one processor on the satellite 110 adapts at least one transmit signal 130 according to the atmospheric event(s). After at least one transmit signal 130 is adapted, the user processor(s) associated with the user monitors the link performance by monitoring (either continuously or intermittently) the bit error rate (and/or the signal strength) of at least one transmit signal 130 received by the user (or target) 150. If the user processor(s) associated with the user determines that the bit error rate is still above the predetermined bit error rate threshold (and/or the signal strength is still below the predetermined signal strength threshold), the processor(s) on the satellite 100 will further adapt at least one transmit signal 130. The processor(s) on the satellite 100 will continue to further adapt at least one transmit signal 130 until the user processor(s) associated with the user determines that the bit error rate is no longer above the bit error rate threshold (and/or the signal strength is no longer below the signal strength threshold).

In some embodiments, at least one processor (either on the satellite 100 or associated with a user) may monitor radiation data from a nuclear detector, on the satellite 100 or associated with the user, for a nuclear event. For example, if the processor(s) (on the satellite 100 or associated with a user) determines that the radiation level is above a certain predetermined radiation level threshold, then the processor(s) (on the satellite 100 or associated with a user) may determine that a nuclear event has occurred. At least one transmit signal 130 will be adapted (e.g., by adapting the transmit signal's 130 interleavers, codecs, data rate, and/or modulation format) by the processor(s) on the satellite 100 according to the severity of the radiation data, when the processor(s) (either on the satellite 100 or associated with a user) has determined from the radiation data from the nuclear detector that a nuclear event has occurred.

In one or more embodiments, individual targets (or users) are separated (or isolated) from one another in the receive field of view by various different techniques. One technique is an in-aperture spatial separation of users. For this technique, for example, a physical grid of areas of the aperture plane may be used to separate users for identification. Another technique is spectral separation, where different wavelengths may be assigned per user such that each user has a unique wavelength(s). Yet another technique is polarization separation, where one user is assigned one polarization (e.g., horizontal polarization or left hand circular polarization) and a different user is assigned the orthogonal polarization (e.g., vertical polarization or right hand polarization). And another technique is temporal separation, where each of the users are assigned different time slots (e.g., time division multiple access (TDMA)). Yet another technique is code separation, where each of the users are assigned a different code (e.g., code division multiple access (CDMA)).

In one or more embodiments, during operation of the disclosed system, after at least one processor (associated with the user and/or with the satellite) determines that at least one atmospheric event (e.g., manmade events (e.g., EMI, EMP, a nuclear environment) or natural events (e.g., solar flares)) has occurred by, for example, monitoring the bit error rate (and/or the signal strength) of the transmit signal 130 and/or monitoring radiation data from a nuclear detector, at least one processor associated with the satellite will begin a shutdown sequence for the satellite. The shutdown sequence is used to safe the satellite during the atmospheric event and to allow for the satellite to be able to quickly recover after the atmospheric event ends autonomously. At the start of the shutdown sequence, the satellite processor(s) stores critical mission parameters of the as-is state of the satellite prior to the atmospheric event by rapidly writing the critical mission parameters to memory (e.g., non-volatile triple redundant memory). Critical mission parameters may include, but are not limited to, gimbal angles, beam steerer positions, critical configuration constants, and time. After the atmospheric event ends, upon restart, the satellite processor(s) rapidly uploads the critical mission parameters from memory. Then, the satellite processor(s) configures the satellite according to the critical mission parameters to allow for recovery.

Figure 2:
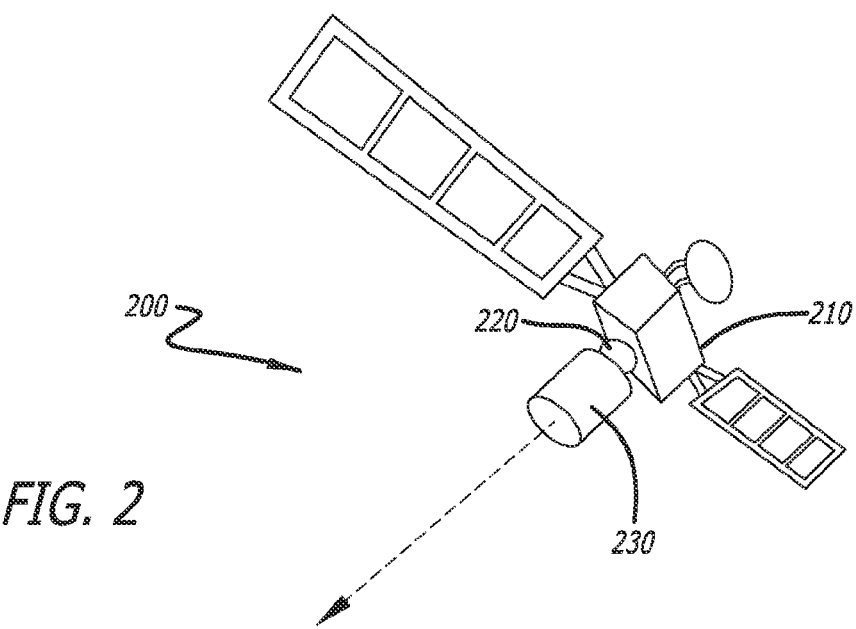
FIG. 2 is a diagram showing an exemplary laser communications satellite, to be employed for the disclosed system for laser communications, including a laser/detector along with a gimbal, in accordance with at least one embodiment of the present disclosure.

FIG. 2 is a diagram showing an exemplary laser communications satellite 200, to be employed for the disclosed system for laser communications, including a laser/detector 230 along with a gimbal 220, in accordance with at least one embodiment of the present disclosure. In this figure, a satellite 200 is shown having a laser/detector unit 220 mounted onto the bus 210. The laser/detector unit 220 comprises a laser for transmission of optical signals and a detector for reception of optical signals. A gimbal 220 is mounted onto the bus 210 and is used to gimbal (i.e. rotate, e.g., in azimuth and/or elevation) the laser/detector unit 220.

Figure 3:
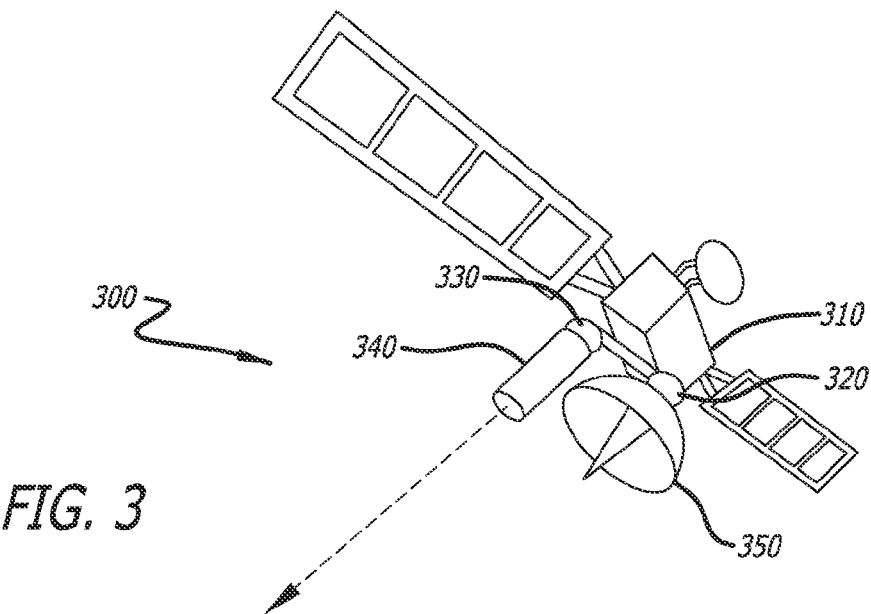
FIG. 3 is a diagram showing an exemplary laser communications satellite, to be employed for the disclosed system for laser communications, including a laser/detector along with a gimbal as well as an antenna along with a gimbal, in accordance with at least one embodiment of the present disclosure.

FIG. 3 is a diagram showing an exemplary laser communications satellite 300, to be employed for the disclosed system for laser communications, including a laser/detector 340 along with a gimbal 330 as well as an antenna 350 along with a gimbal 320, in accordance with at least one embodiment of the present disclosure. In this figure, a satellite 300 is shown having a laser/detector unit 340 mounted onto the bus 310. The laser/detector unit 340 comprises a laser for transmission of optical signals and a detector for reception of optical signals. A gimbal 330 is mounted onto the bus 310 and is used to gimbal (i.e. rotate) the laser/detector unit 340.

Also in FIG. 3, the satellite 300 is shown having an antenna (i.e. a reflector antenna) 350 mounted onto the bus 310. The antenna 350 comprises a reflector for transmitting RF signals and for receiving RF signals. It should be noted that in other embodiments, the antenna 350 may comprise two separate units (e.g., a transmit reflector antenna and a receive reflector antenna) rather than one antenna 350 as is shown in FIG. 3. In addition, a gimbal 320 is mounted onto the bus 310 and is used to gimbal (i.e. rotate, e.g., in azimuth and elevation) the antenna 350. It should be noted that, during operation, the antenna 350 may transmit and receive RF signals to and from another satellite.

Figure 4:
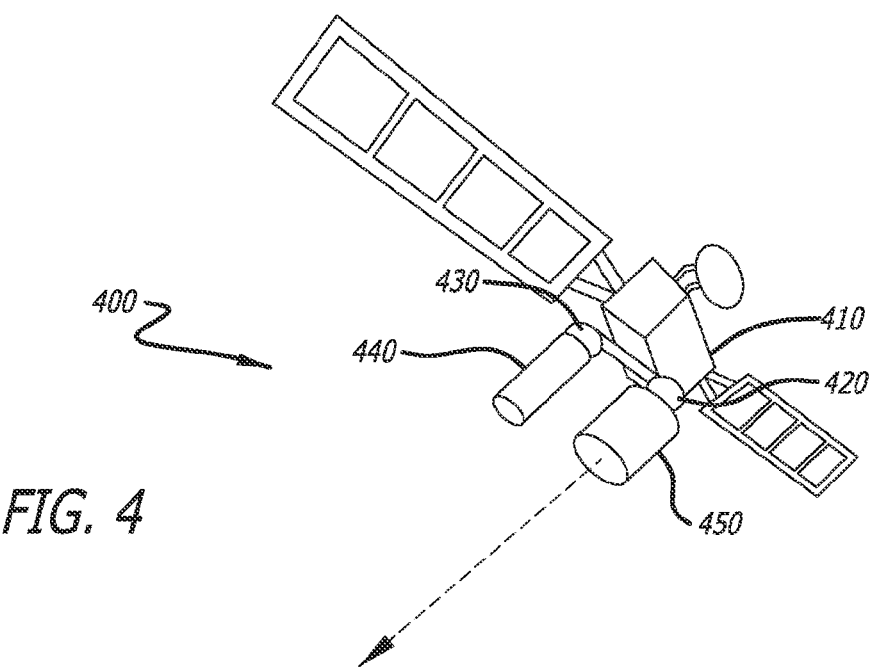
FIG. 4 is a diagram showing an exemplary laser communications satellite, to be employed for the disclosed system for laser communications, including a laser/detector along with a gimbal as well as a telemetry and command (T&C) laser along with a gimbal, in accordance with at least one embodiment of the present disclosure.

FIG. 4 is a diagram showing an exemplary laser communications satellite 400, to be employed for the disclosed system for laser communications, including a laser/detector 450 along with a gimbal 420 as well as a telemetry and command (T&C) laser 440 along with a gimbal 430, in accordance with at least one embodiment of the present disclosure. In this figure, a satellite 400 is shown having a laser/detector unit 450 mounted onto the bus 410. The laser/detector unit 450 comprises a laser for transmission of optical signals and a detector for reception of optical signals. A gimbal 420 is mounted onto the bus 410 and is used to gimbal (i.e. rotate, e.g., in azimuth and elevation) the laser/detector unit 450.

Also in FIG. 4, the satellite 400 is shown having a T&C laser 440 mounted onto the bus 410. The T&C laser 440 transmits T&C transmit signals and receives T&C receive signals. It should be noted that in other embodiments, the T&C laser 440 may comprise two separate units (e.g., a transmit laser and a receive detector) rather than one T&C laser 440 as is shown in FIG. 4. In addition, a gimbal 430 is mounted onto the bus 410 and is used to gimbal (i.e. rotate, e.g., in azimuth and elevation) the T&C laser 440. In one or more embodiments, the T&C laser 440 includes an acquisition sensor. In some embodiments, the T&C acquisition sensor is radiation hardened.

Figure 5:
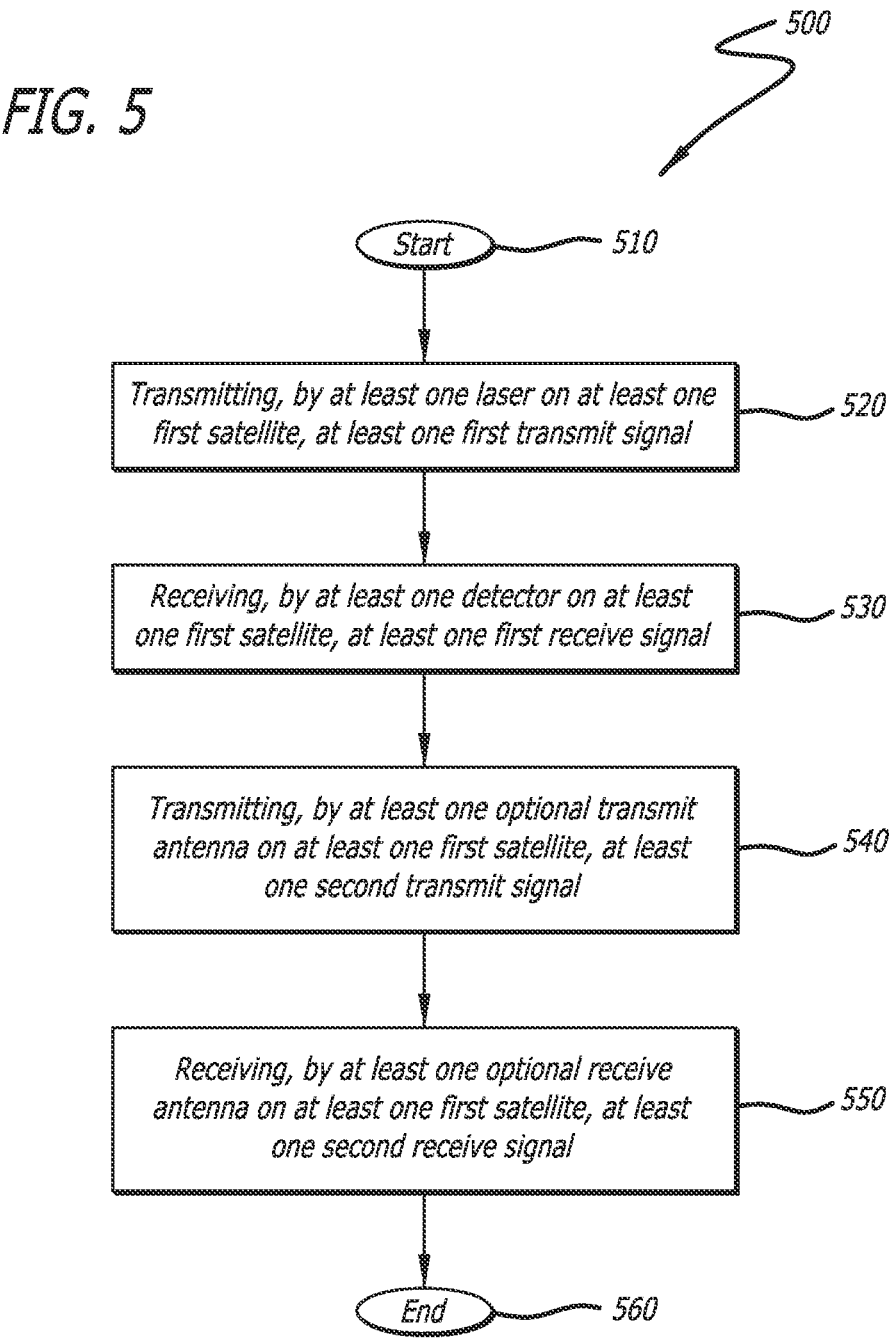
FIG. 5 is a flow chart depicting a disclosed method for laser communications, in accordance with at least one embodiment of the present disclosure.

FIG. 5 is a flow chart depicting a disclosed method 500 for laser communications, in accordance with at least one embodiment of the present disclosure. At the start 510 of the method 500, at least one laser, on at least one first satellite, transmits at least one first transmit signal 520. At least one detector, on at least one first satellite, then receives at least one first receive signal 530. At least one optional transmit antenna, on at least one first satellite, transmits at least one second transmit signal 540. Then, at least one optional receive antenna, on at least one first satellite, receives at least one second receive signal 550. Then, the method 500 ends 560.

Figure 6:
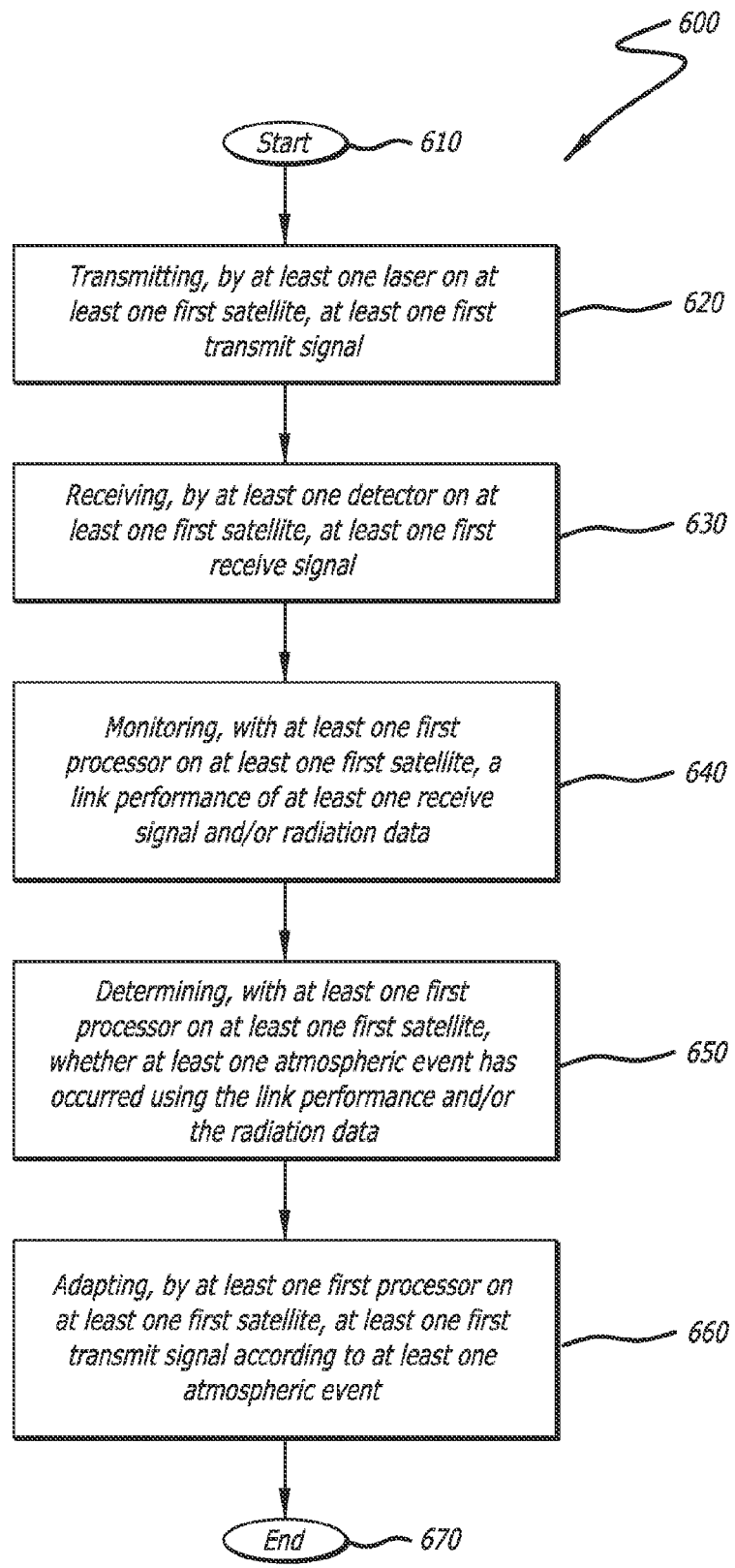
FIG. 6 is a flow chart depicting another disclosed method for laser communications, in accordance with at least one embodiment of the present disclosure.

FIG. 6 is a flow chart depicting another disclosed method 600 for laser communications, in accordance with at least one embodiment of the present disclosure. At the start 610 of the method 600, at least one laser, on at least one first satellite, transmits at least one first transmit signal 620. At least one detector, on at least one first satellite, then receives at least one first receive signal 630. At least one first processor, on at least one first satellite, monitors a link performance of at least one first receive signal and/or radiation data 640. Then, at least one first processor, on at least one first satellite, determines whether at least one atmospheric event has occurred using the link performance and/or the radiation data 650. At least one first processor, on at least one first satellite, adapts at least one first transmit signal according to the atmospheric event 660. Then, the method 600 ends 670.

Figure 7:
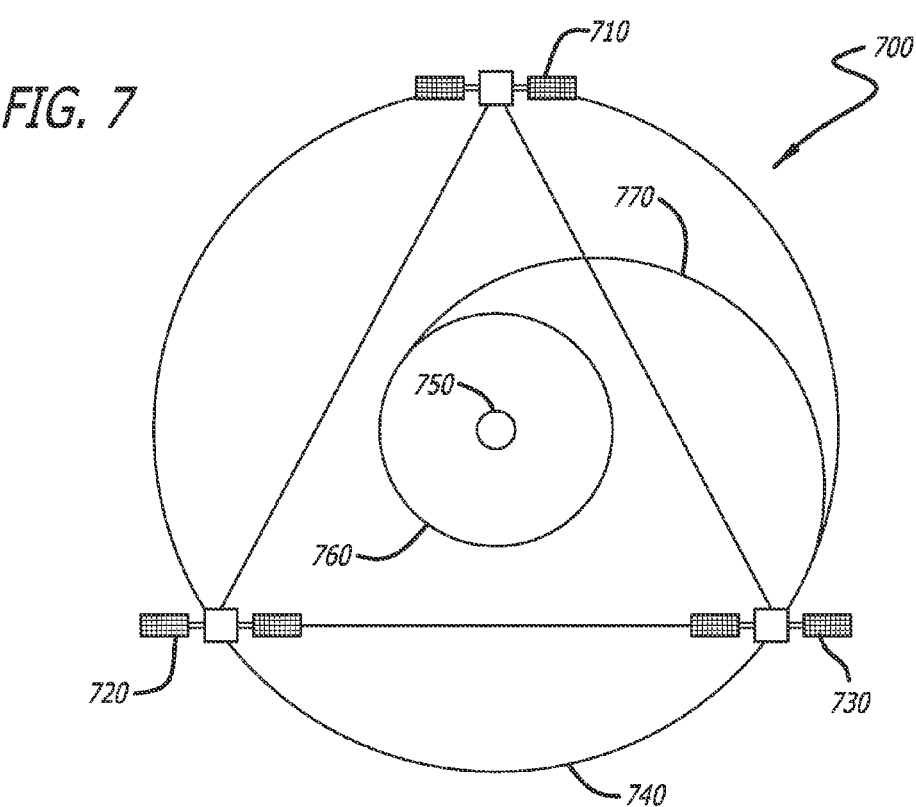
FIG. 7 is a diagram showing the orbit geometry for the disclosed system for laser communications, in accordance with at least one embodiment of the present disclosure.

FIG. 7 is a diagram showing the orbit geometry 700 for the disclosed system for laser communications, in accordance with at least one embodiment of the present disclosure. In this figure, three laser communications satellites 710, 720, 730 are shown to be orbiting the Earth 750 at a S-GEO orbit 740. It should be noted that S-GEO orbit 740, being at a very high orbit, allows for a low probability of detection of satellites and interception of signals, and allows for resilience against manmade threats (e.g., EMP).

When S-GEO 740 is five times higher than GEO 760, the Earth's 750 angular subtense is about 3 to 3.5 degrees (i.e. the field of regard). Typically, it is very difficult to have large apertures and large field of views in a single laser communications system that is small enough to field on a satellite. Using S-GEO 740 (i.e. at five times GEO orbit 760) coupled with a modest data rate allows for a moderately sized aperture and a moderately sized viewfield. As such, as shown in FIG. 7, at S-GEO 740 (i.e. at five times GEO orbit 760), only three satellites 710, 720, 730 (with each using only a single laser communications aperture) are needed to obtain full Earth coverage.

Also shown in this figure, in one or more embodiments, the satellites 710, 720, 730 may reach their final S-GEO orbit 740 by being injected into GEO orbit 760 or geosynchronous transfer orbit (GT) 770 and then by using, for example, a high specific impulse, low thrust propulsion system they can transfer into the S-GEO orbit 740.

Figure 8:
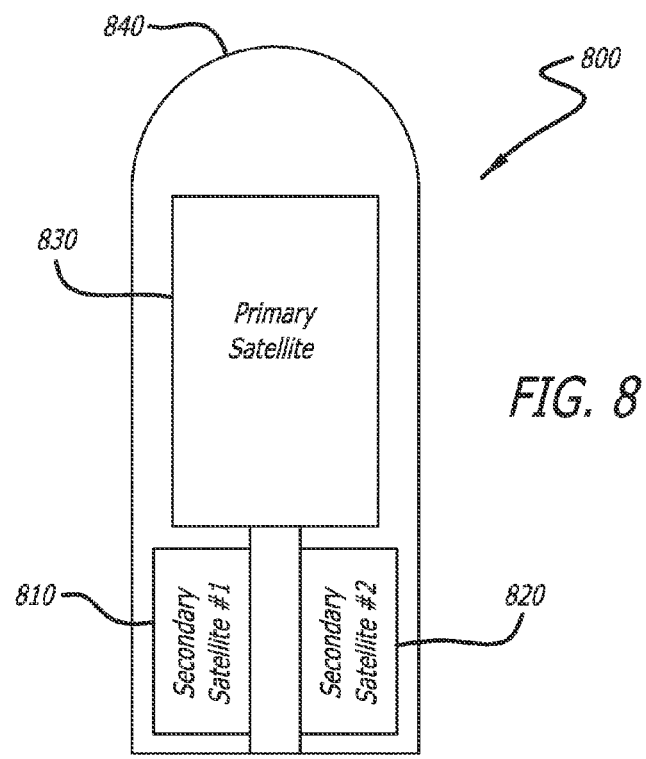
FIG. 8 is a diagram showing an exemplary launch vehicle configuration that may be used for a laser communications satellite of the disclosed system for laser communications, in accordance with at least one embodiment of the present disclosure.

FIG. 8 is a diagram showing an exemplary launch vehicle configuration 800 that may be used for a laser communications satellite of the disclosed system for laser communications, in accordance with at least one embodiment of the present disclosure. In this figure, two lasercom satellites 810, 820 (i.e. secondary satellite #1 and secondary satellite #2), which are compact in size, are shown to be housed in tandem along with a larger satellite (e.g., a RF commercial communications satellite) 830 (i.e. primary satellite) in a single launch vehicle fairing 840. Since lasercom satellites 810, 820 are small in size, multiple satellites may be launched per launch vehicle fairing 840, thereby allowing for a reduction in launch costs. It should be noted that, in other embodiments, various different combinations of lasercom satellite(s) 810, 820 and/or larger satellite(s) 830 can be housed together in a launch vehicle (e.g., three lasercom satellites may be housed with one larger satellite), depending upon the launch vehicle fairing 840 capacity and the satellite sizes.

Figure 9:
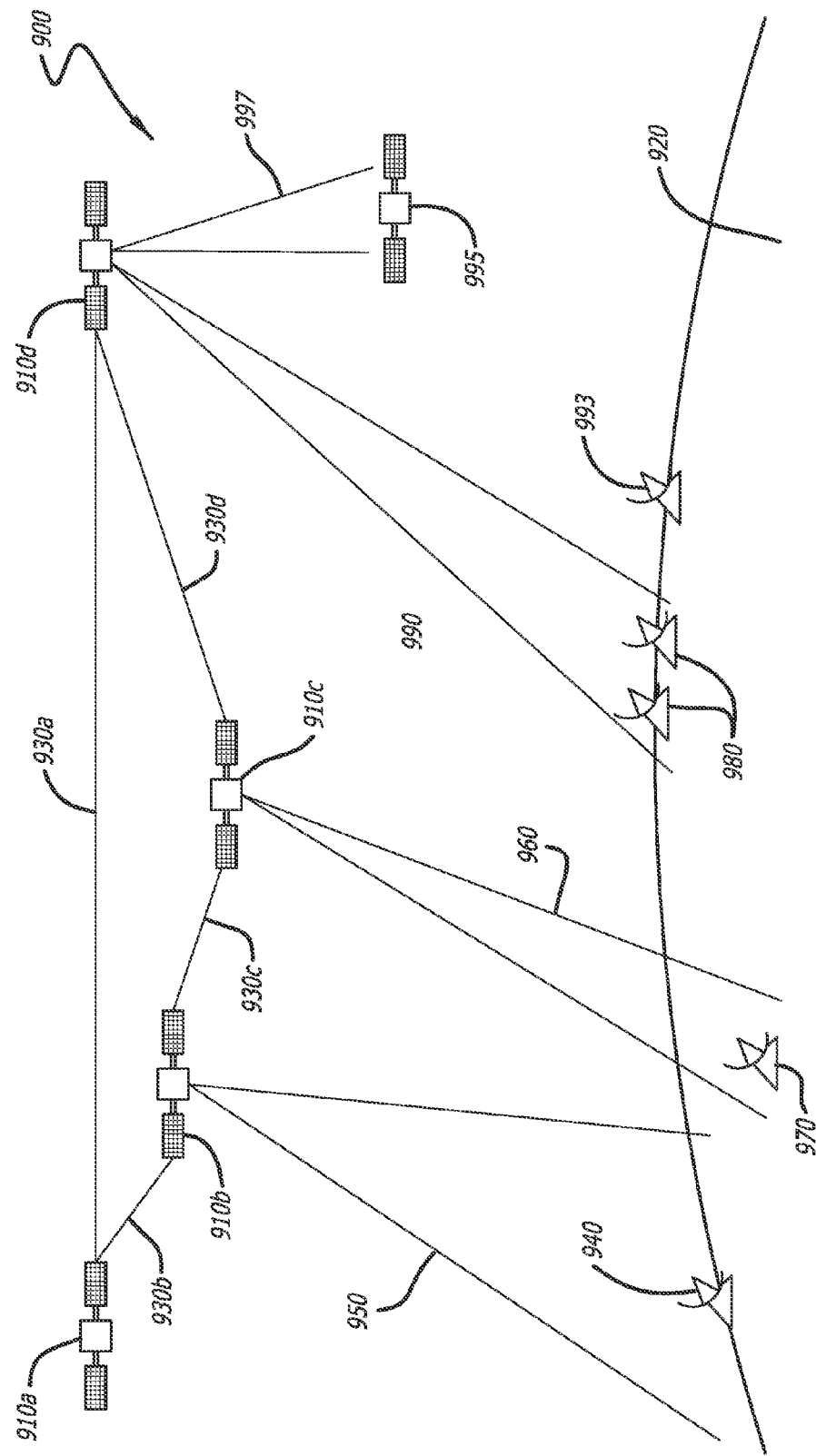
FIG. 9 is a diagram showing the disclosed system for laser communications, in accordance with at least one embodiment of the present disclosure.

FIG. 9 is a diagram showing the disclosed system 900 for laser communications, in accordance with at least one embodiment of the present disclosure. In this figure, four lasercom satellites 910a, 910b, 910c, 910d are shown to be orbiting Earth 920 at S-GEO. Crosslinks (e.g., laser communications and/or RF communications) 930a, 930b, 930c, 930d are shown to be between the lasercom satellites 910a, 910b, 910c, 910d. Satellite 910a is a lasercom satellite that is operating autonomously.

Satellite 910b is a lasercom satellite that is a hybrid RF satellite (refer to FIG. 3). Satellite 910b is shown to be transmitting and receiving RF signals 950 to and from a legacy RF terminal 940 on Earth 920. Satellite 910c is shown to be transmitting and receiving optical signals 960 to and from an undersea user (e.g., a submarine) 970.

Also in this figure, satellite 910d is shown to be transmitting and receiving optical signals to and from multiple user terminals 980 within the beam 990. It should be noted that the beam field of view is approximately 3 to 10 kilometers (km). In one or more embodiments, a user terminal 980 may, for example, include adaptive optics (e.g., deformable mirrors) to compensate for spatial phase perturbations of light caused by post-EMP atmospheric effects. Additionally, in this figure, a terminal (e.g., a space surveillance terminal) 993 is shown to be outside of the narrow beam 990. In one or more embodiments, the terminal 993, outside of the beam 990, may be an adversary ground station attempting to intercept the beam 990.

This figure also shows a satellite 995 orbiting Earth at GEO. Lasercom satellite 910d is shown to be transmitting and receiving optical signals 997 to and from satellite 995.

It should be noted that, as previously mentioned, lasercom satellites 910a, 910b, 910c, 910d may be transmitting and receiving signals to and from various different vehicles (e.g., airborne, terrestrial, and marine) and/or various different entities (e.g., airborne, terrestrial, and marine). FIG. 9 presents only some of the many possible communication scenarios for the disclosed system 900.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for communications, the method comprising:
transmitting, by at least one laser on at least one first satellite, at least one first transmit signal;
receiving, by at least one detector on the at least one first satellite, at least one first receive signal,
wherein the at least one first transmit signal and the at least one first receive signal are laser signals;
adapting, by at least one first processor on the at least one first satellite, the at least one first transmit signal according to at least one atmospheric event;
when the at least one atmospheric event occurs, storing, by the at least one first processor on the at least one first satellite, at least one critical mission parameter of an as-is state of the at least one first satellite in memory; and
when the at least one atmospheric event ends, uploading, by the at least one first processor on the at least one first satellite, the at least one critical mission parameter from the memory, and configuring, by the at least one first processor on the at least one first satellite, the at least one first satellite according to the at least one critical mission parameter.

2. The method of claim 1, wherein the at least one atmospheric event is at least one of a natural event or a manmade event.

3. The method of claim 2, wherein the natural event is a solar flare.

4. The method of claim 2, wherein the manmade event is an electromagnetic pulse (EMP).

5. The method of claim 1, wherein the at least one first satellite is in super-geosynchronous earth orbit (S-GEO).

6. The method of claim 1, wherein the at least one first transmit signal employs interleavers, and the interleavers are adaptable according to the at least one atmospheric event.

7. The method of claim 1, wherein the at least one first transmit signal employs codecs, and the codecs are adaptable according to the at least one atmospheric event.

8. The method of claim 1 wherein a data rate of the at least one first transmit signal is adaptable according to the at least one atmospheric event.

9. The method of claim 1, wherein the at least one first transmit signal is modulated, and a modulation format of the at least one first transmit signal is adaptable according to the at least one atmospheric event.

10. The method of claim 1, wherein the method further comprises:
monitoring, with the at least one first processor on the at least one first satellite, at least one of link performance of the at least one receive signal or radiation data;
determining, with the at least one first processor on the at least one first satellite, whether the at least one atmospheric event has occurred using at least one of the link performance or the radiation data.

11. The method of claim 1, wherein the method further comprises:
monitoring, with the at least one second processor associated with at least one user, at least one of link performance of the at least one transmit signal or radiation data;
determining, with the at least one second processor associated with at least one user, whether the at least one atmospheric event has occurred using at least one of the link performance or the radiation data.

12. The method of claim 1, wherein the method further comprises receiving, by at least one user, the at least one first transmit signal.

13. The method of claim 12, wherein more than one of the at least one user are separated by spatial separation.

14. The method of claim 12, wherein more than one of the at least one user are separated by spectral separation.

15. The method of claim 12, wherein more than one of the at least one user are separated by polarization separation.

16. The method of claim 12, wherein more than one of the at least one user are separated by temporal separation.

17. The method of claim 12, wherein more than one of the at least one user are separated by code separation.

18. A system for communications, the system comprising:
at least one laser on at least one first satellite to transmit at least one first transmit signal;
at least one detector on the least one first satellite to receive at least one first receive signal,
wherein the at least one first transmit signal and the at least one first receive signal are laser signals; and
at least one first processor, on the at least one first satellite, to adapt the at least one first transmit signal according to at least one atmospheric event; when the at least one atmospheric event occurs, to store at least one critical mission parameter of an as-is state of the at least one first satellite in memory; and when the at least one atmospheric event ends, to upload the at least one critical mission parameter from the memory and to configure the at least one first satellite according to the at least one critical mission parameter.

19. The system of claim 18, wherein the system further comprises at least one shielding on the at least one first satellite for protection from the at least one atmospheric event.

20. The system of claim 18, wherein the system further comprises at least one telemetry and command (T&C) acquisition sensor on the at least one first satellite, wherein the at least one T&C acquisition sensor is radiation hardened.

21. The system of claim 18, wherein the system further comprises adaptive optics associated with at least one user, wherein the at least one user receives the at least one first transmit signal.

* * * * *